United States Patent [19]

Vonnegut et al.

[11] 4,305,280
[45] Dec. 15, 1981

[54] RAINFALL INTENSITY SENSOR

[75] Inventors: Bernard Vonnegut, Albany, N.Y.; Terry E. Battalino, Oxnard, Calif.

[73] Assignee: The United States of America as represented by the Secretary of the Navy, Washington, D.C.

[21] Appl. No.: 117,744

[22] Filed: Feb. 1, 1980

[51] Int. Cl.$^3$ .............................................. G01N 1/14
[52] U.S. Cl. .................................................... 73/171
[58] Field of Search ........................................ 73/171

[56] References Cited

U.S. PATENT DOCUMENTS

| | | | |
|---|---|---|---|
| 1,236,381 | 8/1917 | Rogers | 73/171 |
| 2,740,293 | 4/1956 | Brady | 73/171 |
| 3,472,088 | 10/1969 | Ojard | 73/171 |

*Primary Examiner*—James J. Gill
*Attorney, Agent, or Firm*—R. S. Sciascia; P. C. Lall; A. P. Durigon

[57] ABSTRACT

An instrument having a logarithmic response is provided which continuously measures rates of rainfall over a range of from 0.3 to 350 mm/hr by determining the electrical power required to evaporate the water as it arrives on an exposed sensor. The sensor determines the flux of rain or cloud water arriving on its surface and consists essentially of a porous, water absorbent, dielectric material held between two metallic electrodes across which a fixed electrical potential is maintained. The water is evaporated by electrical heating as it arrives on the surface, and the amount of power required is a measure of the mass flux of water to the collecting surface.

21 Claims, 6 Drawing Figures

RAINFALL INTENSITY SENSOR

This invention concerns precipitation measurement and, more particularly, such measurement wherein the rate of precipitation is determined by measuring the evaporation rate of the precipitate.

A variety of direct-reading rain and/or snow accumulation gauges are available for particular uses such as in gardening, forestry and farming. More sophisticated gauges are available for remotely recording precipitation and transmitting the data by pulse or otherwise over telephone lines, by radio, etc. for recordation and analysis. Some gauges determine rain rate by means of electrical conductivity wherein the amount of power consumed in maintaining a predetermined temperature differential is monitored or the electrical energy expanded to vaporize rainfall collected in a horizontally disposed flat container is measured. These electrically operated devices are deficient, however, in that they are unnecessarily complex and therefore subject to frequent breakdown and inaccurate response, they must be maintained in a horizontal attitude, and they are subject to great inaccuracies when rainfall is irregular or arrives from directions other than substantially normal at the planar surfaces of the devices. The present invention avoids these and other deficiencies of direct-reading gauges by providing, among other features, a water-absorbent base for measuring mass flux whose shape and attitude can be varied without affecting the efficiency of the gauge.

Accordingly, it is an object of the present invention to provide a direct-reading mass flux gauge that can be used to measure the liquid water content of clouds as well as the rate of rainfall and which has an omnidirectional surface for receiving and evaporating impinging water.

Another object of this invention is to provide a direct-reading rain gauge that is simple and inexpensive to construct, functions in snow as well as rain, and can measure rainfall intensity over a wide range continuously.

A further object of this invention is to provide a rainfall intensity sensor that can be mounted in a variety of attitudes and used in most areas where substantially instantaneous determinations of the rate of rainfall or of cloud intensity are required.

Other objects, advantages and novel features of the invention will become apparent from the following detailed description thereof when considered in conjunction with the accompanying drawings in which like numerals represent like parts throughout and wherein.

The present invention, in general, comprises a sensor having a porous, water-absorbent, dielectric material which becomes conductive when wet and is held between two metallic electrodes across which a fixed electrical potential is maintained. Water arriving on the exposed sensor is rapidly absorbed, greatly reducing the electrical resistance at that point and causing a sudden electrical surge which heats the wet portion of the dielectric and evaporates the water. The amount of power required is a measure of the mass flux of water to the collecting surface.

Figure 1:
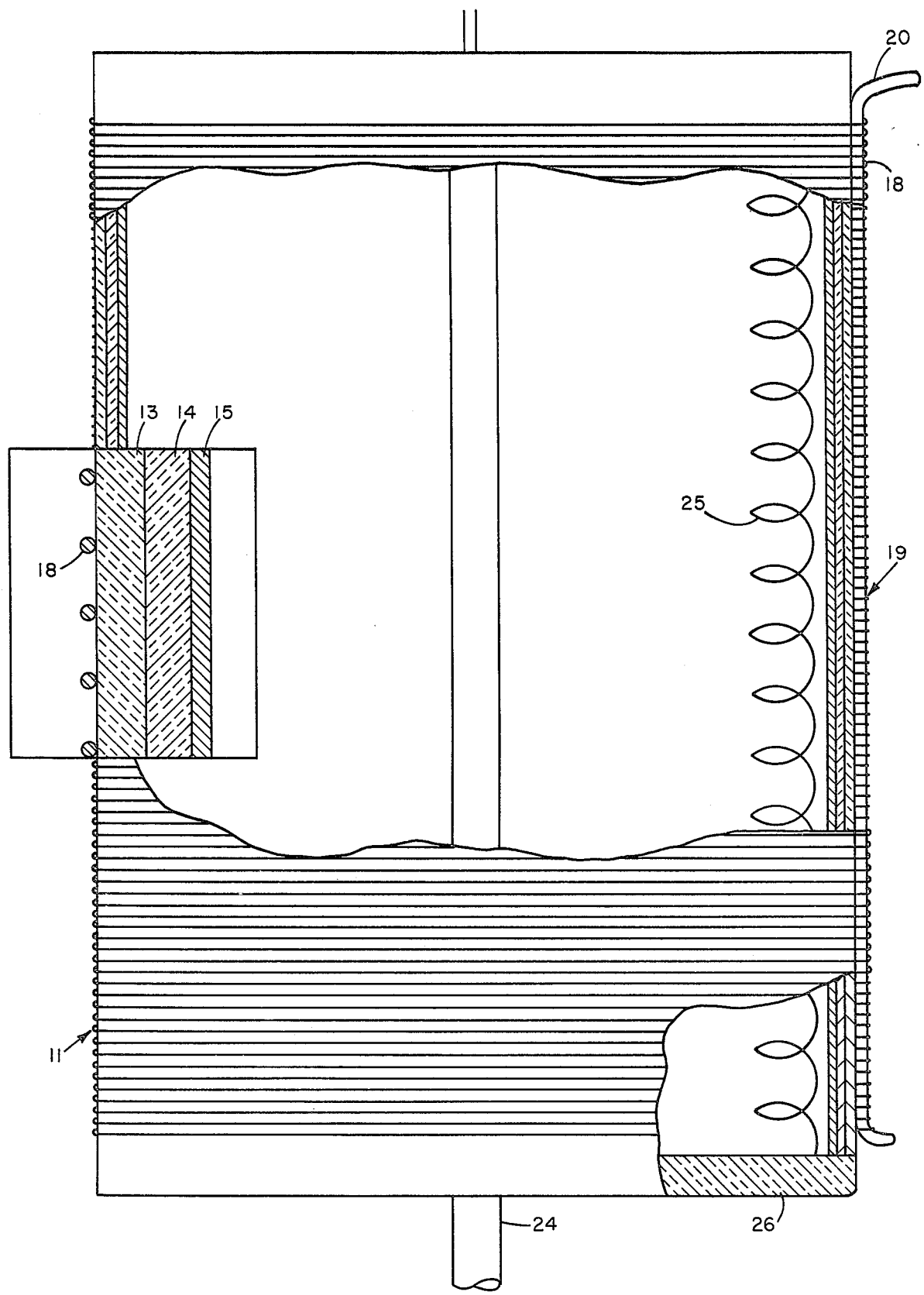
FIG. 1 is a front elevation and enlarged view insert partly in section of a preferred embodiment of the invention.

Referring to the drawings, FIG. 1 illustrates one embodiment of the invention wherein a sensor 11 is formed preferably of two layers of asbestos 13 and 14, as shown in the enlarged insert, wound on a cylindrical metal body 15 in the shape of an ordinary food container. Body 15 forms the inner electrode of the device and is coupled to an outer electrode, which consists of a helically wound uniformly spaced wire 18 preferably made of monel, through the asbestos layers when sufficiently wet to conduct current. A highly conductive connecting wire 19 which provides a good contact with the outer asbestos layer is positioned between this layer and the helix and soldered to all turns thereof to form a unit having a low resistance. Connecting wire 19 serves to minimize resistive heating from current flowing through the monel helix and preferably is crimped and soldered at the end indicated at 20 to a banana plug, not shown, for external connection. Joining each turn of the helix to wire 19 also prevents the helix from unwinding in the event a loop should break and form individual turns moving laterally on asbestos layer 13. Sensor 11 is mounted by conventional means, not shown, on a center post 24 and its interior is heated by an electrical resistance heating element 25 installed therein which is adapted to maintain the sensor at substantially 20° C. above ambient temperature. This heating greatly reduces the absorption of water vapor and also serves to melt snow, thereby affording a measurement of precipitation at temperatures below freezing. Body 15 may be closed by a cap 26 made of strong dielectric material such as asbestos cement. The sensor is preferably supported with its longitudinal axis horizontal and aligned in any desired direction a sufficient distance on the order of a meter above flat surfaces to minimize temperature, wind diversion and other effects.

Figure 2:
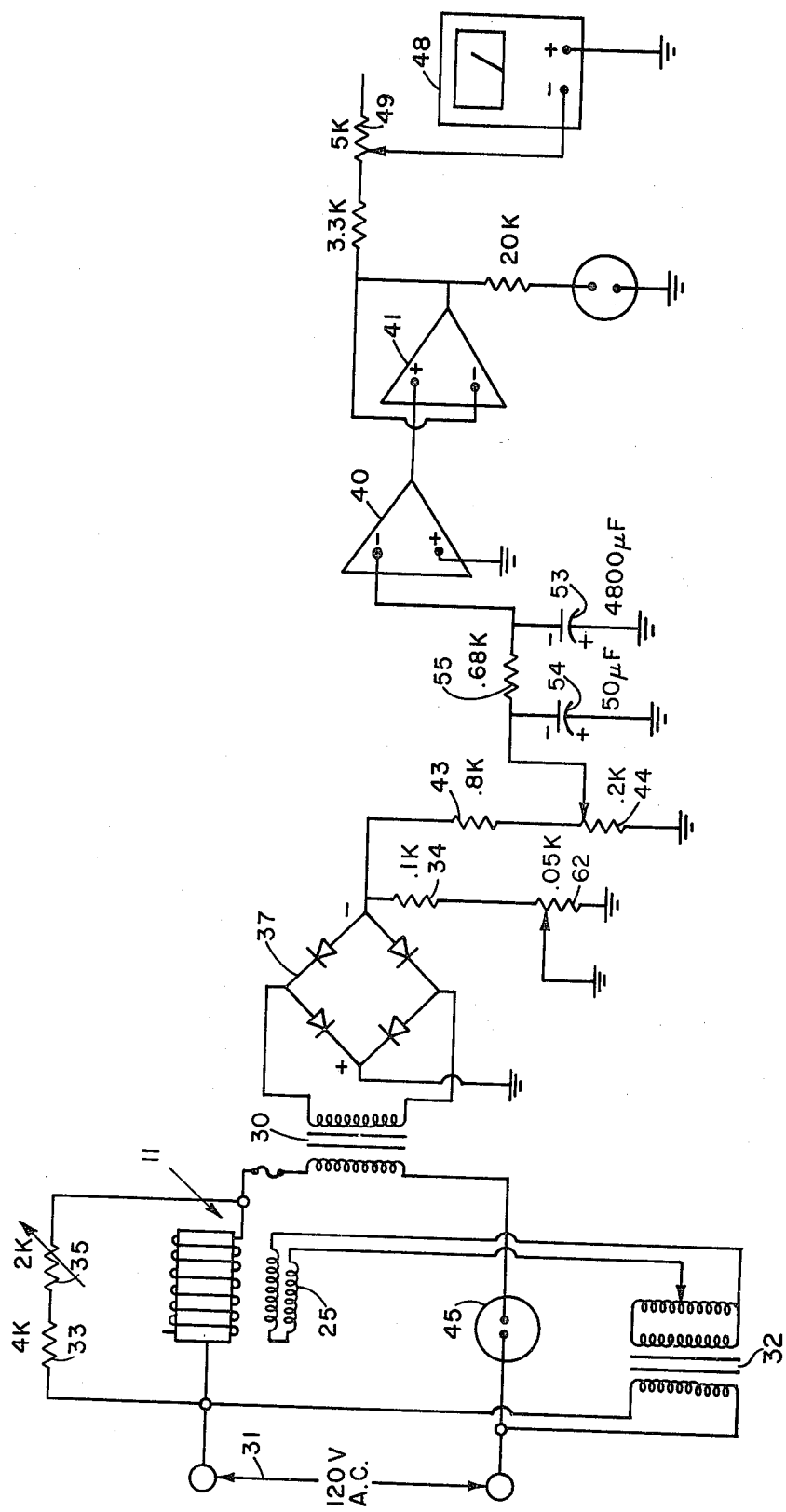
FIG. 2 is a schematic diagram of the electronic circuits in the embodiment of FIG. 1.
Figure 3:
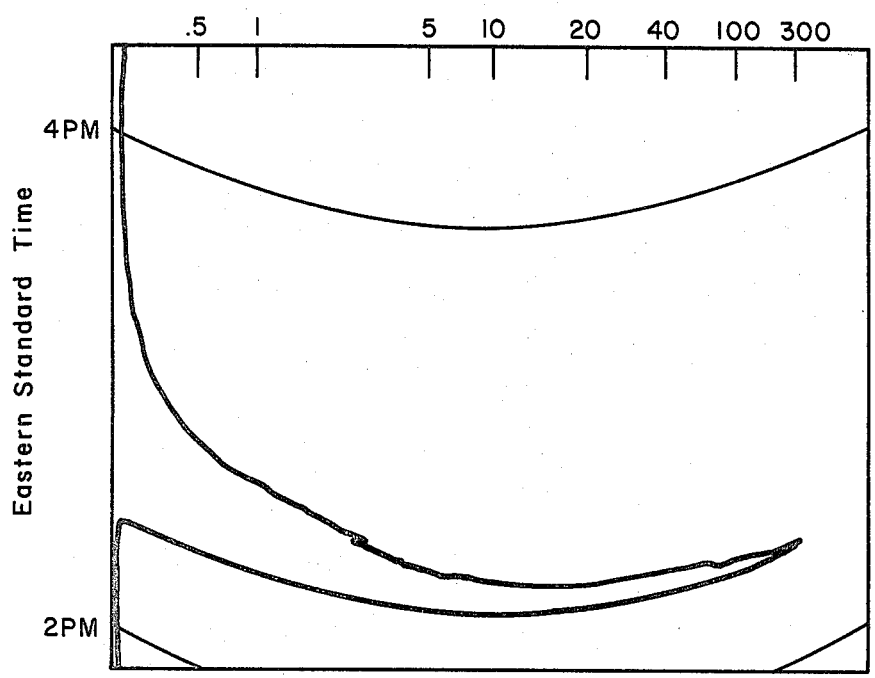
FIG. 3 is a rainfall intensity record produced by a thunderstorm associated with a cold front.
Figure 5:
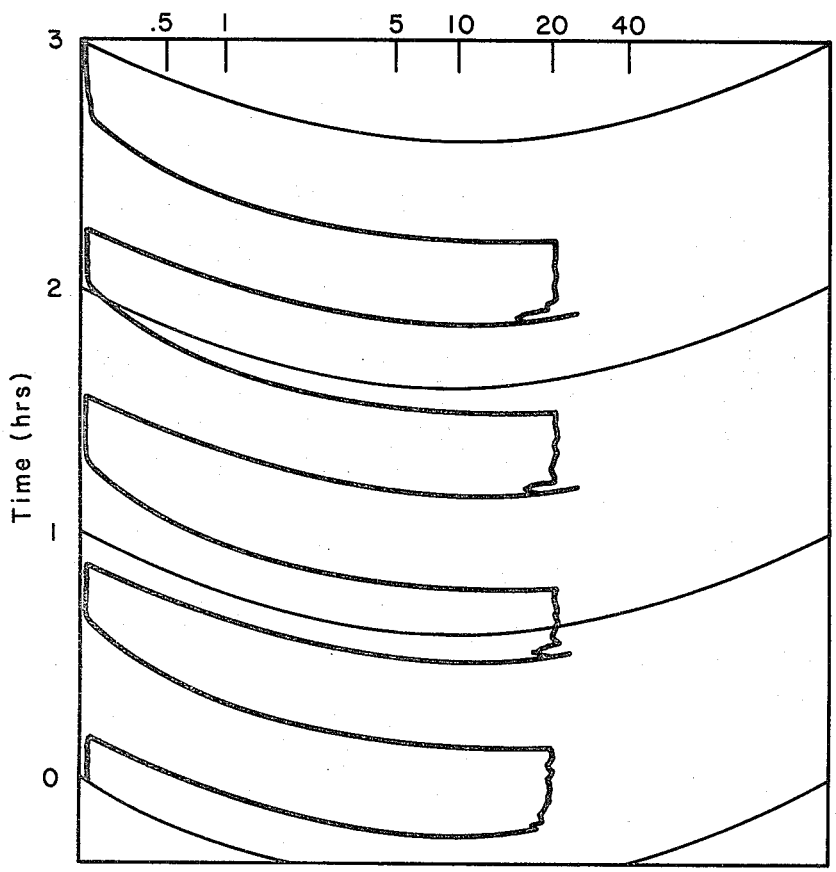
FIG. 5 is a record of a simulated rain illustrating the rate of response of the invention.
Figure 4:
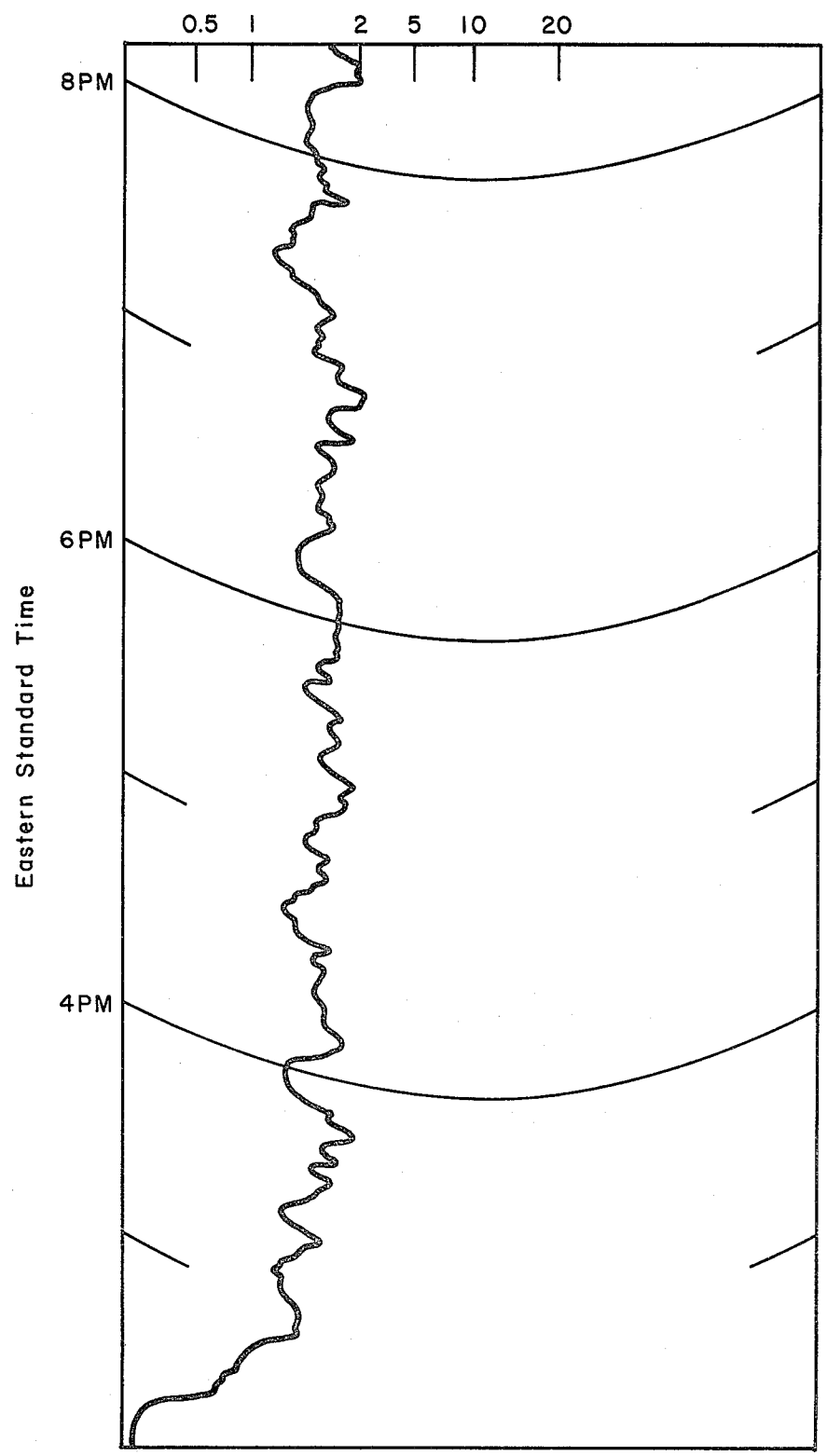
FIG. 4 is a snowfall intensity record from a moderate snowstorm near Albany, N.Y.
Figure 6:
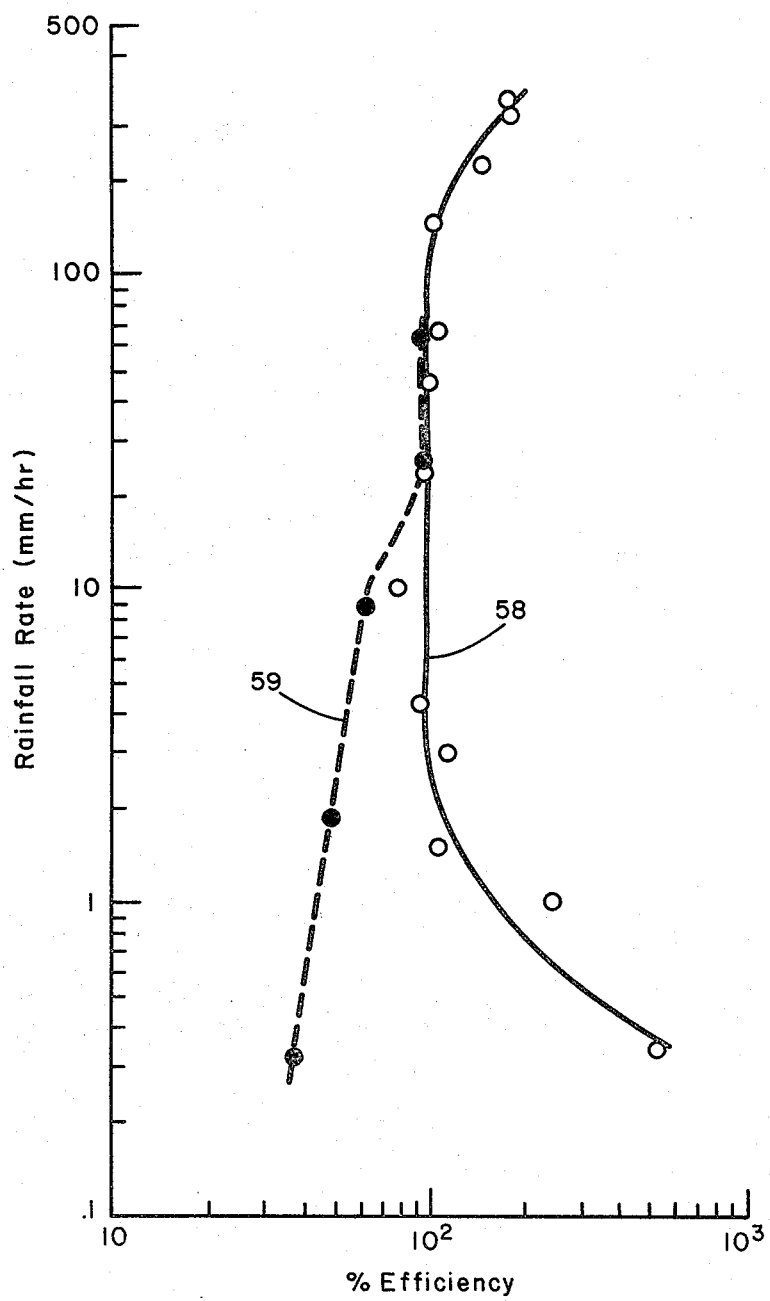
FIG. 6 is a graphical presentation showing the efficiency of the sensor as a function of rainfall rate.

FIG. 2 is one embodiment of a circuit for providing a logarithmic response to rainfall which obviates the necessity of making frequent range changes on records having a linear response. Sensor 11, shunted by a fixed resistor 33 in series with a variable resistor 35, is connected in series with the primary coil of a transformer 30 the secondary winding of which is connected to ground over a rectifier 37 and secondary load impedance resistors 34 and 62. Fixed resistor 33 and variable resistor 35 bias the transformer 30-rectifier 37 network to produce a voltage across the transformer secondary coil. This signal is isolated from ground, rectified by rectifier 37, and processed by logarithmic and buffer amplifiers 40 and 41 before being recorded as a rainfall rate. The heating element 25 is connected in the secondary winding of a transformer 32 the primary winding of which is connected across the supply 31. Resistors 43 and 44 comprise a voltage divider with resistor 44 adjusted so that a $-10$ v appears across the amplifier 40 input when a meter 45 reads 15 amps. These values correspond to the maximum rainfall rate to be measured, on the order of 800 mm/hr, and a chart recorder 48 is offset with the aid of a variable resistance 49 to fullscale deflection for this signal. Recorder 48 is now calibrated to read the total current of the sensor circuit, i.e. the current indicated by meter 45. Capacitors 53 and 54 and resistor 55 form a filtering circuit. FIG. 3 is a rainfall intensity record produced by a thunderstorm associated with a cold front and shows a peak rainfall rate of substantially 300 mm/hr at an air temperature of 30° C. and a wind velocity of 4.5 m/sec. FIG. 4 is a snowfall intensity record from a moderate snowstorm. Heating element 25 supplies heat that melts snow arriving on the sensor, this snow is then vaporized by the sensor and the water equivalent rate is recorded in millimeters per hour. The air temperature was −15° C. and the wind velocity was 2.2 m/sec. FIG. 5 is a record of a simulated rain turned on and off in periods of about 20 minutes to illustrate the rate of response of the sensor, while FIG. 6 shows the efficiency of the sensor as a function of rainfall rate with solid line 58 representing the efficiency when the heating element is dissipating 12.5 watts and broken line 59 representing the efficiency when internal heating is eliminated.

In operation, it is assumed that all of the energy required to evaporate the water incident on the sensor is supplied by eletrical heating, that all of the energy supplied by the electrical heating is utilized to evaporate the water, and that all of the water incident on the sensor is evaporated. In such a case, the electrical power, P, drawn by the sensor is given by the expression $P = CIA$ where I is the rainfall intensity, C is a consant proportional to the energy required to evaporate a unit mass of rain, and A is the projected area of the sensor on which the rain falls. Since the energy required to evaporate the water varies somewhat with ambient conditions and since before the water is evaporated its temperature must be raised to the boiling point if the droplets are large or if the rain is intense, the energy per gram can be calculated, using values given in the Handbook of Chemistry and Physics, 37th Edition, published by Chemical Rubber Publishing Co., 2310 Superior Ave., N.E., Cleveland, Ohio, to vary from 640 to 620 cal./gm at sea level pressure if the temperature of the rain varies from 0° C. to +20° C. in cases of low rates of rainfall with small droplets wherein vaporization can probably take place at temperatures as much as 40° C. below the boiling point. The boiling point and the rate of evaporation vary, of course, with barometric pressure.

It is apparent, therefore, that depending on conditions, the energy for evaporation of a given mass of water may vary between 600 and 640 cal./gm, a variation of about 7%. For most purposes, such a variation of less than 10% is negligible, particularly when it is considered that the rate of rainfall can vary over several orders of magnitude. Assuming as a constant value a median of 620 cal./gm, constant C is given a value of 0.072 if A is in square centimeters and I is in millimeters/hr, resulting in P, the power, being expressed in watts.

The sensor may be constructed in various sizes depending on several factors. A very small collecting area reduces the amount of powder required for operation of the unit, however, the small unit may not give a good average picture of the rate of rainfall. If desired, a unit may be made so small as to give measurements of one raindrop at a time. On the other hand, making the unit large increases sensitivity and provides a good average of the rainfall rate even when the drops are far apart. A large unit has the disadvantage of very high power consumption in heavy rainfalls. In the embodiment described herein, cylinder 15 is 75 mm in diameter and 113 mm long and comprises one electrode, helix 18 is 0.25 mm diameter monel wire wound with spacings of 1.27 mm, and the asbestos layers are each 0.76 mm in thickness. In a sensor of this size, the projected area of exposure is 79 $cm^2$ which represents a compromise between the two extremes. It should be noted that a unit of this modest size draws about 1.7 kw of power in a rainfall of 300 mm/hr.

The circuits shown in FIG. 2 provide a logarithmic response which obviates the necessity of making frequent range changes on a recorder having a linear response. The sensor 11 shunted by the resistors 33 and 35 is connected in series with the primary coil of transformer 30 so that the current between electrodes 15 and 18, which is proportional to the rainfall rate, produces a voltage signal across the transformer secondary. This signal, which is isolated from ground, can then conveniently be rectified and filtered and processed by amplifiers 40 and 41 before being recorded as a rainfall rate. FIG. 3 shows that with this arrangement the data is compressed so that rains varying over three orders of magnitude can be recorded on a chart recorder without need for scale changes. Resistors 34 and a variable resistor 62 set to 35 ohms in this embodiment provide the proper secondary load impedance for transformer 30.

The assumptions used to arrive at the expression $P = CIA$ are only approximately true since not all of the electrical power supplied to the sensor is utilized for the evaporation of water. Initially, when water first arrives on the sensor, some of the heat developed is required to raise the temperature of the water and the sensor itself to the boiling point. Also, during operation a portion of the energy leaves the sensor by convection, conduction, and radiation. In very light rainfall, if the ambient humidity is very low or if there is bright sunlight, a portion of the energy required for evaporation may be derived either from the atmosphere itself or from the incident solar radiation. Experiments carried out to determine the actual power required by the sensor under various rain conditions have demonstrated that a weather housing and wind shield should be used to assure accurate measurements of rainfall intensities during high wind speeds. The rate of response of the rain sensor varies with its history of exposure to moisture, precipitation, dirt and air pollution, all of which affect to some degree the rate of water absorption and the concentration and mobility of ions in the wet asbestos. FIG. 5 illustrates the behavior of a new sensor when exposed to a square wave simulated rainfall turned on and off for periods of 20 minutes. A sensor that has received exposure to 150 cm of natural rain may be expected to have a somewhat slower but still substantially accurate response. The rate of response of the sensor can be increased by reducing the thickness of the asbestos paper that is used, the response time varying substantially linearly with the paper thickness.

The only maintenance required under normal response times is the replacement of the sensor after a selected period of exposure to the weather, the frequency of replacement being determined by local weather factors, primarily air pollution. At Albany, N.Y., a two-layer asbestos sensor required no maintenance for a period on the order of one year whereas for a single-layer embodiment of the same thickness inspection at least is desirable at intervals of about 3 to 4 months. Where a fast response time is desired, a thin layer of asbestos should be used and replaced often. Although the asbestos may be observed to fluff up after repeated exposure to water, it has been determined that this does not affect performance and hence no attention to this condition is required. Sensor efficiency may be computed by determining the ratio of theoretical power, per $P=CIA$, to the actual power and plotting this ratio as a function of rainfall rate with and without internal heating as shown in FIG. 6. When the heating element is dissipating a constant 12.5 watts, it causes the lower portion of the efficiency curve to bend toward higher efficiency, as indicated by solid line 58. At high rainfall intensities, the efficiency becomes higher and even exceeds 100% because some of the rain splashes off and is not evaporated. When the heat source is eliminated, as indicated by broken line 59, the efficiencies are much lower at rainfall rates less than 10 mm/hr. At higher rainfall rates, the power supplied by the heater becomes inconsequential and the two efficiency curves become identical.

Heat losses at the sensor are responsible for the low efficiencies when internal heating is eliminated. The contribution to the power losses due to conduction and convection are difficult to evaluate, but the radiation heat loss can be approximated using the Stefan-Boltzman law. If the ambient air temperature is 20° C. and assuming the radiating surface has an area of 79 cm$^2$, an emissivity of 0.95, and a temperature of 100° C., the calculated power loss is 5 watts. This is of the same order of magnitude as the power received in sunlight at Albany, N.Y.

The rain measuring sensor of the present invention can be connected in series with an ammeter to provide a direct analog indication of rainfall intensity. A record of rainfall rate is then obtained by converting the current to a voltage signal suitable for a chart recorder. The sensor can also be used with a voltage-to-frequency converter and minicomputer to digitize and store rain data, thus allowing a measurement of the total rainfall as well as the rate of rainfall.

What is claimed is:

1. A direct-reading mass flux precipitation gauge that can be used to measure the liquid water content of clouds as well as rates of rainfall and snowfall comprising:

a sensor having a projected exposure area made of a porous, water absorbent, dielectric material in layer form which becomes electrically conductive when wet;

a metallic electrode on each of the opposed surfaces of said porous layer holding said layer therebetween;

means for maintaining a fixed electrical potential across said electrodes so that water or snow arriving on the exposed area of said porous layer is rapidly absorbed by said porous layer, substantially reducing the electrical resistance at the points of absorption and causing an electrical surge that heats the wet portion of the porous layer and evaporates the water;

means for determining the amount of power required to evaporate the incident precipitation and thereby measure the mass flux of precipitation to the porous layer; and means for deploying said sensor in the atmosphere.

2. The precipitation gauge as defined in claim 1 wherein said exposed area is cylindrical in shape to provide omnidirectional sensing and said inner electrode is a cylindrical metal body open at one end and includes a cap made of dielectric material closing said open end, said outer electrode made of a highly conductive metal formed to expose a substantial portion of said porous layer to the environment.

3. The precipitation gauge as defined in claim 2 wherein said power determining means includes an electrical heating element mounted within said body and means remote from said body for energizing said heating element so as to maintain body temperature at a desired temperature.

4. The precipitation gauge as defined in claim 3 wherein said body temperature is maintained at substantially 20° C. above ambient temperature to substantially reduce the absorption of water vapor and to melt snow.

5. The precipitation gauge as defined in claim 4 and further including means for providing a logarithmic response to absorbed precipitation including a power source and circuit means connecting said power source to said electrodes and said heating element so that the power consumed is directly related to the ambient precipitation rate and determined by the power required to evaporate the precipitation as it arrives on said porous layer.

6. The precipitation gauge as defined in claim 5 wherein said outer electrode is a wire helix having turns spaced substantially 1¼ mm apart and the project area of exposure of said porous layer is substantially 79 cm$^2$.

7. The precipitation gauge as defined in claim 5 wherein body cylinder diameter, cylinder length, number of turns of outer electrode helix and thickness of porous layer are variable so that relatively large sensors susceptible of measuring high average precipitation rates as well as relatively small sensors consuming substantially less power and susceptible of measuring rainfall one drop at a time at decreased efficiency may be fashioned.

8. The precipitation gauge as defined in claim 7 wherein the projected area of exposure of said porous layer is substantially 79 cm$^2$ so as to measure a rainfall of substantially 300 mm/hr when said sensor draws substantially 1.7 kw of power.

9. The precipitation gauge as defined in claim 8 wherein said logarithmic response means includes respective transformer primary coils for said heating element and said outer electrode helix connected in parallel and said response means is adjusted so that a selected voltage occuring at a selected amperage in said helix transformer primary indicates the maximum precipitation rate to be measured.

10. The precipitation gauge as defined in claim 9 and further including a common connector joining each turn of said helix to minimize resistive heating from current flowing through said helix.

11. The precipitation gauge as defined in claim 10 wherein said porous layer is made of asbestos and has a thickness on the order of ¾ mm to provide an increased sensor response time.

12. The precipitation gauge as defined in claim 10 wherein said porous layer is made of asbestos and has a thickness on the order of 1½ mm to provide a reduced sensor response time.

13. A precipitation intensity sensor comprising:

a cylindrical metal body open at one end and a cap made of dielectric material closing said open end;

a porous water-absorbent dielectric material covering the external cylindrical surface of said body;

a highly conductive external electrode in strip form contacting and uniformly spaced about said external dielectric covering;

an electrical heating element mounted within said body and means connected to said heating element for heating the interior thereof to maintain body temperature substantially at a desired differential above ambient temperature, said body and said external electrode electrically coupled by precipitation absorbed by said dielectric material; and means for deploying said body in the atmosphere.

14. The sensor as defined in claim 13 and further including means for providing a logarithmic response to absorbed precipitation including a power source and circuit means connecting said power source to said external electrode, said body and said heating element so that the power consumed is directly related to the ambient precipitation rate and determined by the power required to evaporate the precipitation as it arrives on said dielectric covering.

15. The sensor as defined in claim 14 and further including a center post extending along the longitudinal axis thereof, said body deployed with said center post in a horizontal attitude, said dielectric material made of asbestos in layer form to facilitate wetting and drying and thereby continued use for lengthy periods on the order of one year.

16. The sensor as defined in claim 15 wherein said asbestos layer has a thickness on the order of $\frac{3}{4}$ mm to provide an increased sensor response time.

17. The sensor as defined in claim 16 wherein said asbestos layer is substantially doubled in thickness to provide a reduced sensor time.

18. The sensor as defined in claim 17 and further including a common connector joining the spaced portions of said external electrode in a longitudinal direction to minimize resistive heating from current flowing through said external electrode.

19. The sensor as defined in claim 18 wherein said heating element is an electrical heating coil disposed within said body and said logarithmic response means further includes respective transformer primary coils for said heating coil and said external electrode connected in parallel and said response means is adjusted so that a selected voltage occurring at a selected amperage in said external electrode transformer primary indicates the maximum precipitation rate to be measured.

20. The sensor as defined in claim 19 wherein said external electrode is a helix formed of substantially $\frac{1}{4}$ mm diameter corrosion resistant metal wire having turns spaced substantially $1\frac{1}{4}$ mm apart and the projected area of exposure of said sensor is substantially 79 cm$^2$, said sensor adapted to draw substantially 1.7 kw of power in a rainfall of 300 mm/hr.

21. The sensor as defined in claim 19 wherein body cylinder diameter, cylinder length, number of turns of external electrode, and thickness of asbestos layer are variable so as to form relatively large sensors susceptible of measuring high average rainfall rates and relatively small sensors consuming substantially less power and susceptible of measuring rainfall one drop at a time at decreased efficiency.

* * * * *